United States Patent

Nippes et al.

Patent Number: 5,927,052
Date of Patent: Jul. 27, 1999

[54] METHOD AND DEVICE FOR FLAVORING TEA AND TEA-LIKE PRODUCTS

[75] Inventors: Helmut Nippes, Solingen-Merscheid; Michael Klein, Willich, both of Germany

[73] Assignee: Teepak Spezialmaschinen GmbH, Meerbusch, Germany

[21] Appl. No.: 08/720,114

[22] Filed: Sep. 27, 1996

[30] Foreign Application Priority Data

Sep. 27, 1995 [EP] European Pat. Off. ............ 95115219

[51] Int. Cl.[6] ........................................ B65B 01/02
[52] U.S. Cl. .................... 53/445; 53/450; 53/455; 53/154; 53/205; 53/240; 53/550; 53/562; 426/410
[58] Field of Search ........................ 426/392, 394, 426/410, 415; 222/129, 132, 133, 134; 53/445, 455, 474, 450, 134.2, 154, 155, 168, 240, 237, 238, 550, 553, 562, 205

[56] References Cited

U.S. PATENT DOCUMENTS

| | | |
|---|---|---|
| 2,775,080 | 12/1956 | Stirn et al. . |
| 3,218,776 | 11/1965 | Cloud . |
| 3,813,848 | 6/1974 | Romagnoli . |
| 4,404,787 | 9/1983 | Hazelwood . |
| 4,437,294 | 3/1984 | Romagnoli . |
| 4,609,556 | 9/1986 | Goedert . |
| 4,747,250 | 5/1988 | Rossi . |
| 4,870,808 | 10/1989 | Romagnoli . |
| 4,921,021 | 5/1990 | Andersson . |
| 4,959,947 | 10/1990 | Reif . |
| 4,986,455 | 1/1991 | Rambold . |
| 5,081,819 | 1/1992 | Cloud . |
| 5,233,813 | 8/1993 | Kenney et al. . |

FOREIGN PATENT DOCUMENTS

| | | |
|---|---|---|
| 3108178 | 1/1982 | Germany . |
| 3115589 | 3/1982 | Germany . |
| 3211696 | 11/1982 | Germany . |
| 3720362 | 7/1988 | Germany . |
| 3701230 | 8/1988 | Germany . |
| 1566248 | 4/1980 | United Kingdom . |

*Primary Examiner*—Daniel Moon
*Attorney, Agent, or Firm*—Robert W. Becker & Associates

[57] ABSTRACT

A method for flavoring tea with a granular flavoring agent includes the step of removing from a reservoir a predetermined amount of granular flavoring agent. The predetermined amount of granular flavoring agent is placed as a small heap onto a moving endless filter paper strip. Subsequently, a predetermined amount of tea is placed adjacent to or onto the small heap of flavoring agent. The tea and flavoring agent heaped onto the filter paper strip are subsequently enclosed in a tea bag made from the filter paper strip accordingly. The inventive device for performing the method includes a device for moving the endless filter paper strip in an advancing direction. A tea metering device and a metering device for a flavoring agent are positioned directly above the endless filter paper strip whereby the metering device for the flavoring agent is positioned upstream of the tea metering device in the advancing direction.

24 Claims, 2 Drawing Sheets

METHOD AND DEVICE FOR FLAVORING TEA AND TEA-LIKE PRODUCTS

BACKGROUND OF THE INVENTION

The present invention relates to a method and a device for flavoring tea and tea-like products, such as herbal teas, freeze dried teas, infusion etc., with preferably granulated flavoring agents whereby from a reservoir in which the flavoring agent is contained a predetermined amount of flavoring agent is removed, placed onto a strip of continuously transported envelope material, especially endless filter paper strips, together with a predetermined amount of tea, and is subsequently packaged in tea bags formed of the envelope material.

For the purpose of flavoring teas, it is known from German Offenlegungsschrift 37 01 230 to connect to a conventional tea packing machine a metering device for flavoring agent with which granules or agglomerates of the flavoring agents are added with two adjustable metering chambers in a defined amount to the tea. The fine tea material for filling the tea bags is divided with a metering wheel into identical portions within the tea bagging machine and is then placed in the from of small heaps onto the continuously moved envelope material, i.e the filter paper by a transport wheel. The metered addition of the flavoring agent to the tea is performed within the transport area between the metering wheel and the transport wheel whereby due to the movements of the machine parts a tea flavoring agent mixture will result which is then positioned in the form of heaps positioned onto the filter paper strip and packaged in the tea bags formed thereof.

It has been shown to be disadvantageous in the context of automatic metering processes to mix the tea and the flavoring agent. Flavoring agents are compositions of special natural, artificial, and nature-identical scenting and flavoring compounds which have sugar-like properties, some being hygroscopic, and have the tendency to separate from the fine tea to be filled in the tea bags or to agglomerate. All these properties result in soiling of the machine area between the metering wheel and the transport wheel where the addition of the flavoring agent takes place. In the end the soiling makes it impossible to provide for a uniform and reproducible addition of the flavoring agent. The metering rings become soiled by sticky deposits and the chambers within the metering wheel and the transport wheel become clogged so that the small heaps to be placed onto the filter paper strip will vary in size. In the end, it is necessary to perform frequent machine cleaning operations requiring demounting of machine parts.

From German Offenlegungsschrift 32 11 696 a method for manufacturing a flavoring preparation is known which is to be used for flavoring tea. Disadvantageously, this flavoring preparation is also mixed with the leaf tea and subsequently packaged in tea bags so that the aforedescribed disadvantages of the method occur in the same manner.

It is therefore an object of the present invention to provide a method for flavoring tea or tea-like products, with which the aforementioned disadvantageous can be avoided and with which a safe metering of the flavoring agent without soiling of the machine, even at high packaging velocities of more than 300 tea bags per minute, is possible.

SUMMARY OF THE INVENTION

The inventive method for flavoring tea with a granular flavoring agent according to the present invention is primarily characterized by:

a) removing from a reservoir a predetermined amount of the granular flavoring agent;

b) placing the predetermined amount of the granular flavoring agent as a small heap onto a moving endless envelope material;

c) subsequently placing a predetermined amount of tea as a heap proximal to the small heap of flavoring agent; and d) enclosing the heaped tea and flavoring agent in a tea bag cut and formed the endless envelope material.

Advantageously, the step c) includes the step of completely covering the small heap of flavoring agent with the tea from all exposed sides such that the tea functions as a sealing and protecting layer for the flavoring agent during the step d).

Preferably, the step c) includes the step of positioning the tea off-center relative to the small heap of flavoring agent.

Expediently, the method further comprises the step of performing a quality and quantity control of the flavoring agent between the step b) and the step c).

The step of performing a quality and quantity control of the flavoring agent includes preferably removing a predetermined number of the small heaps of flavoring agent and examining the removed small heaps separately.

In a preferred embodiment of the present invention, the step b) includes forming the small heap of flavoring agent so as to have a height that is much smaller than a diameter thereof. Preferably, the volume of the small heap of flavoring agent in selected to be 0.1 cm$^3$ to 1 cm$^3$. Preferably, the flavoring agent is provided in the form of granules having a distribution of granule size as follows:

| Contents in % | Granule size in mm |
| --- | --- |
| less than 1.0 | smaller than 0.2 |
| less than 3.0 | 0.2 to 0.5 |
| 30–50 | 0.5 to 1.0 |
| 40–60 | 1.0 to 1.4 |
| less than 0.5 | 1.4 to 2.0 |
| maximum 0.2 | greater than 2.0 |

The present invention also relates to a device for flavoring tea with a granular flavoring agent. The device according to the present invention is primarily characterized by:

means for moving an endless envelope material in an advancing direction;

a tea metering device; and a metering device for a flavoring agent positioned directly above the endless envelope material upstream of the tea metering device in the advancing direction.

Preferably, the tea metering device and the metering device for the flavoring agent are spaced at a distance and the working cycles of the tea metering device and the metering device for the flavoring agent are coordinated such that a small heap of flavoring agent placed onto the endless envelope material in a metered amount by the metering device for the flavoring agent is completely covered by the amount of tea placed by the tea metering device onto the small heap of flavoring agent.

Preferably, the metering device for the flavoring agent comprises a reservoir and a rotating drum with at least one metering chamber for receiving an amount of flavoring agent from the reservoir and placing the amount of flavoring agent as a small heap onto the endless envelope material.

Preferably, the metering device for the flavoring agent further comprises a housing enclosing the rotating drum and having an inlet for allowing passage from the reservoir into the at least one metering chamber and an outlet for releasing the flavoring agent from the at least one metering chamber.

Advantageously, the metering device for the flavoring agent further comprises a means for air-conditioning.

Preferably, the device further comprises a doctor blade positioned at the rotating drum for removing excess flavoring agent from the at least one metering chamber.

Preferably, the rotating drum comprises two radially extending cutouts and two inserts placed into the cutouts and having radially outwardly positioned depressions defining the metering chambers.

The inserts are preferably adjustable.

In another embodiment of the present invention the inserts are removable and exchangeable.

The depressions preferably are concave and have a drop shape with a deep portion and a shallow portion.

In a direction of rotation of the rotating drum the shallow portion is leading and the deep portion is following.

In yet another embodiment of the present invention the device further comprises a device for performing a quality and quantity control of the flavoring agent that is positioned in the advancing direction downstream of the metering device of the flavoring agent. Preferably, the device for performing a quality and quantity control is comprised of a suction device including a suction tube positioned above the endless envelope material strip and a vacuum pump.

Preferably, the device further comprises at least one sensing device for monitoring the small heaps of flavoring agent, the sensing device positioned between the metering device for the flavoring agent and the tea metering device.

Advantageously, the sensing device is a photoelectric sensor.

Advantageously, the sensing device is positioned in the advancing direction upstream of the device for performing the quality and quantity control of the flavoring agent. In another embodiment of the present invention the sensing device is positioned in the advancing direction downstream of the device for performing the quality and quantity of the flavoring agent.

In yet another embodiment of the present invention one sensing device is positioned in the advancing direction upstream of the device for performing quality and quantity control of the flavoring agent and another one of the sensing devices is positioned downstream of the device for performing a quality and quantity control of the flavoring agent.

According to the present invention, the flavoring agent in a first method step is placed onto the envelope material, preferably any type of filter paper material as commonly used for tea bags, in the form of an endless strip as a metered, small heap, and subsequently, in a second step an amount of tea is placed onto the envelope material in proximity to the heap of the flavoring material and then both are together packaged in a tea bag. The term "proximal" or "proximity" in the context is meant to indicate a placement of the tea adjacent to overlapping with or covering the small heap of flavoring agent. Preferably, in the subsequent second method step the small heap of flavoring agent is completely covered with the predetermined amount of tea deposited on the envelope material. The amount of tea thus preferably completely encloses the small heap of flavoring agent from all exposed sides and serves as a sealing and protective layer for the flavoring agent during the following transporting and packaging processes. With this method it is possible to preform an exact metering of the flavoring agent even for fast operating tea packaging machines with working cycles of up to 400 tea bags per minute because any conceivable method step of addition and/or mixing is avoided and instead a simple and fast positioning of a small heap of flavoring agent onto the envelope material strip is performed. Accordingly, within this method step any formation of dust or scattering of flavoring agent and/or tea is minimized and soiling, crust-like depositions and sticky residues, known from methods of the prior art, are eliminated.

Since according to the present invention in the second method step the placed small heap of flavoring agent is enclosed from all sides by the predetermined amount of tea acting as a sealing and protective layer, i.e., the tea heap covers all exposed sides of the heap of flavoring agent, steps no free flavoring agent is accessible or visible at any surface during further processing steps. Instead, the tea covers the granules of the flavoring agent completely and thus, due to this layered arrangement, any soiling of the metering wheel and transport wheel of the tea metering device is avoided. The heap of flavoring material is essentially fixed in its position. The subsequently occurring transporting and packaging processes can thus be performed continuously and substantially maintenance-free, i.e., service friendly, even with machines that operate at vary fast speeds. The packaging machine thus remains relatively clean because it comes in contact exclusively with the tea.

According to an expedient embodiment of the invention it is suggested that the small heaps of flavoring agent are arranged off-center relative to the heaps of tea. This allows for an optimization of the transport and packaging processes while taking into consideration the forces acting on to the tea material to be filled into the tea bags, even for twin chamber tea bags. For twin chamber tea bags there is also, according to the present invention, the possibility to carry out an even more exact and finer metering of the flavoring agent such that either into each chamber or into only one twin of the double-chamber tea bag a small heap of flavoring agent is introduced. Such a variation is not known from the prior art.

Further, it is suggested that subsequent to the positioning of the small heap of flavoring agents onto the envelope material, but before the step of covering it with the tea, a quality and quantity control of the metering of the flavoring agent is performed. This is carried out expediently by sucking a certain number of heaps as samples off the endless envelope material and separately examining with respect to quality and quantity (exact metering) of the flavoring agent so that it is possible to provide the finished product with a quality warranty. This is especially important in cases in which flavoring is combined with vitamin addition or when it is required to observe certain medicinal specifications.

Preferably, the flavoring agent is a granular material with the following size distribution

| Distribution in % | Granule size in mm |
|---|---|
| less than 1.0 | less that 0.2 |
| less than 3.0 | 0.2 to 0.5 |
| 30–50 | 0.5 to 1.0 |
| 40–60 | 1.0 to 1.4 |
| less than 0.5 | 1.4 to 2.0 |
| maximum 0.2 | greater than 2.0. |

The small heaps of flavoring agent are positioned in a flat arrangement (see drawings) on the envelope material, i.e., there height is substantially smaller than their diameter. They preferably have a volume of 0.1 to 1.0 $cm^3$.

The device of the present invention for flavoring teas or tea-like products is comprised of a metering device for the tea and a metering device for the flavoring agent positioned above the envelope material. The metering device for the flavoring agent, relative to the movement of the envelope material, is positioned at a distance upstream of the tea metering device directly above the envelope material strip (see drawings). Preferably, the distance between the flavoring agent metering device and of the tea metering device and working cycles are coordinated such relative to one another that the small heaps of flavoring agent are covered by the tea on three sides after being deposited onto the small heap of flavoring material already resting on the envelope material strip. By arranging the metering device for the flavoring agent at a distance upstream of the tea metering device, it is possible to deposit a small heap of flavoring agent completely separate, of the tea without involving a mixing process and to subsequently cover it with tea. Since the metering device for the flavoring agent is positioned directly above the envelope material strip, a loss-free and dust-free, exactly metered deposition of the small heap of flavoring agent is provided and any free falling of the flavoring agent with resulting dust tail formation and accidental scattering is avoided.

Preferably, the metering device for the flavoring agent is comprised of a reservoir and a rotating drum connected thereto The metering drum has at least one metering chamber for receiving the flavoring agent from the reservoir and for positioning the flavoring agent as a small heap onto the envelope material strip. The rotating drum can be arranged on a center shaft which is synchronously driven by the tea packaging machine. In this context it is expedient to enclose the rotating drum in a casing that leaves open the receiving portion for the flavoring material and the removal portion where the flavoring agent. It is furthermore advantageous to is provide a doctor blade at the rotating drum within its receiving area with which an exact chamber filling is made possible.

In order to maintain the flavoring agents in a dry and flowable consistency, it is suggested to air-condition the flavoring agent metering device relative to its surrounding, i.e., the atmosphere. For this purpose, the metering device can be air tightly sealed or provided with inner pressure.

According to a preferred embodiment of the invention, the rotating drum has two radially extending cutouts positioned at an angle relative to one another which are provided with adjustable and/or exchangeable segment inserts. Their radially outwardly oriented surfaces have depressions that define the metering chambers, and are preferable concave and have a drop shape, as shown in the drawing. Such a rotating drum is simple to manufacture, provides a two chamber embodiment that allows for high working cycles, and, due to the exchangeability and/or adjustability of the segment inserts, can be easily adapted to any desired metering volume. The drop-shaped, concave embodiment of the outer surfaces according to a preferred embodiment facilitates, in view of the flow behavior of the flavoring agent, receiving and releasing of the flavoring agent. In an advantageous embodiment of the invention, it is suggested to arrange the voluminous part of the drop in the direction of rotation of the rotating drum in the follower position instead of the leading position.

For a volume and quality control a sample collecting device for the flavoring agent can be arranged in the direction of movement downstream of the metering device. This sample collecting device is preferably comprised of a suction device with a suction tube arranged at the envelope material strip, and a vacuum pump. With this device it is possible to remove individual small heaps of flavoring agent and to guide as many as desired to an evaluation device for quality and weight control. It may be advantageous in this context to provide a sensing device in the form of, for example, a photoelectric sensor arranged upstream and/or downstream of the suction device in order to monitor the deposited small heaps of flavoring agent.

In summarizing the above, it is for the first time possible with the present invention to provide high working cycle speeds in the context of packaging flavored tea in tea bags and to achieve exact metering, including a quality and volume control. The flavoring agent is preferably covered by the tea to be packaged such that a soiling of the machine is prevented and that therefore the otherwise necessary daily demounting, cleaning, and reassembly of the tea metering device is no longer. Metering is flexible with respect to individual amounts as well as with respect to the portions that will finally be enclosed in the tea bag.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1:
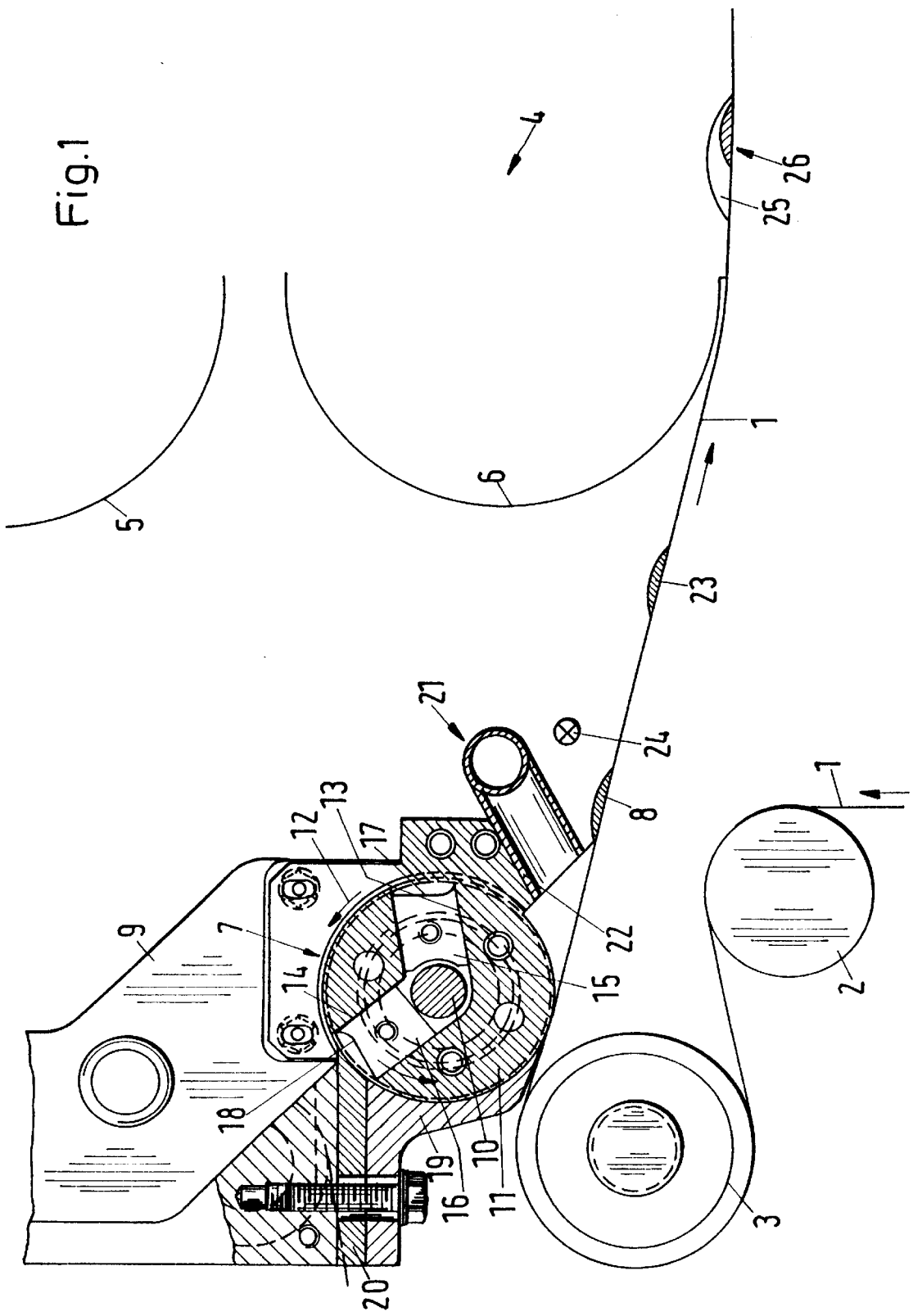
FIG. 1 is a schematic front view of a part of a tea bag packaging machine with a device for adding a flavoring agent.

A conventional tea bag packaging machine according to FIG. 1 comprises an envelope material strip, i.e., a filter paper strip 1; to be transported through the machine. The strip moves, as shown for the part of the machine represented in FIG. 1; via deflecting roller 2 and deflecting roller 3 to the tea metering device 4. The filter paper strip 1 is continuously moved in the direction of the arrows within the tea bag packaging machine whereby the tea metered by the tea metering device 4, comprising a metering wheel 5, is positioned in equal portions with transport wheel 6 onto the continuously moving filter papers strip 1. Subsequently, in a manner not represented in the drawings, the filter paper strip 1 is formed into hose-like structure from which individual filled tea bags are produced. The output of the machine is approximately 400 tea bags per minute.

In order to be able to achieve with such a tea packaging machine a flavoring of the teas, a flavoring agent metering device 7 is arranged at a distance to the tea metering device 4. The arrangement is such that individual small heaps of flavoring agent are positioned onto the filter paper strip 1. The method step of positioning is realized in that the metering device for the flavoring agent directly above the filter paper strip 1 so that no dust development will occur. For this purpose, below a reservoir 9 for a granular flavoring agent, a rotating drum 11 is fastened to a driven shaft 10 which is continuously rotated in the direction of arrow 12 synchronously to the movement of the filter paper strip 1. The rotating drum 11 comprises two radially extending cutouts 13, 14 which are arranged at an oblique angle to one another Segment inserts 15, 16 are positioned in the cutouts 13, 14 and are radially adjustable. The fastening of these inserts is achieved with screws so that the segment inserts 15, 16 are exchangeable in order to adapt the thus formed metering chamber in their shape and size to the properties of the respective flavoring agent.

For embodying the metering chambers 17, 18 the radially outwardly positioned surfaces of the segment inserts 15, 16 are drop shaped and concave whereby the thicker portion of the drop in the direction of rotation is arranged so as to follow. In conjunction with the housing 19 that tightly encloses the rotating drum 11 a metering is thus delimited. A metered amount of flavoring agent removed from the reservoir 9 can thus be directly transported which the metering chamber onto the filter paper strip 1. For this purpose, the housing 19 is open below the reservoir 9 in the area where the flavoring agent is received and above the filter paper strip 1 in the area where the flavoring agent is deposited. For insuring an exact filling of the metering chambers, a doctor blade 20 is connected in the receiving area at the housing 19 which removes and retains excess granular material so that flavoring agent is prevented from entering the gap between the rotating drum 11 and the housing 19.

Between the tea metering device 4 and the flavoring agent metering device 7 a sampling device 21 is arranged. It is comprised of a non-represented vacuum pump and suction tube 22 connected to the vacuum pump. The suction 22 has a suction opening positioned directly above the filter paper strip 1. It is thus possible to remove by suction the small heaps of flavoring agent, positioned on the filter paper strip 1 by the flavoring agent metering device 7 and to guide the flavoring agent to a non-represented evaluating device for preforming a quality and weight control. Whether a small heap of flavoring agent has actually been positioned on the filter paper strip 1, can be monitored with a sensing device, for example, in the form of a photoelectric sensor 24 which is positioned within the movement path upstream or downstream of the suction tube 22. In the shown embodiment the photoelectric sensor 24 is positioned downstream of the suction tube 22 in order to be thus able to control, on the one hand whether the small heap of flavoring agent for packaging together with tea is present at all and furthermore to check whether with respect to a sampling of the small heap of flavoring agent, a complete removal of the flavoring agent has taken place.

The small heap 23 of flavoring agent deposited onto the filter paper strip 1 by the metering device 7 is then transported to a position below the transport wheel 6 of the tea metering device 4 and is then covered completely by the amount 25 of tea to be packaged, as shown in the right half of FIG. 1. The arrangement of the small heap 23 of the flavoring agent within the tea enclosure 25 is preferably such that the small heap 23 is off center, as shown schematically in the drawing. As mentioned before, it is also possible to deposit the tea adjacent to the small heap of flavoring agent or to deposit the tea such that it only partially covers the small heap of flavoring agent.

Figure 2:
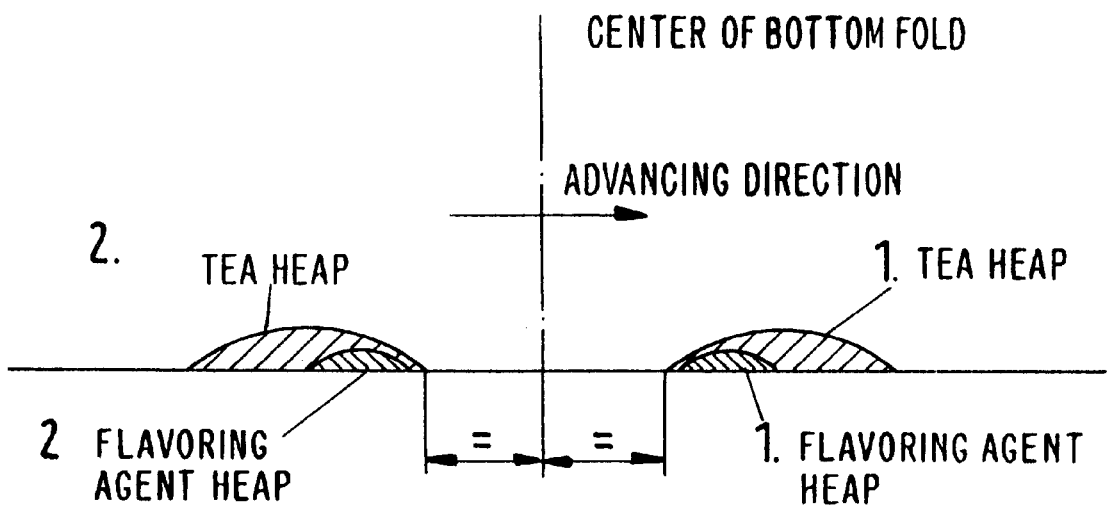
FIG. 2 is a schematic representation of a method for flavoring tea.
Figure 3:
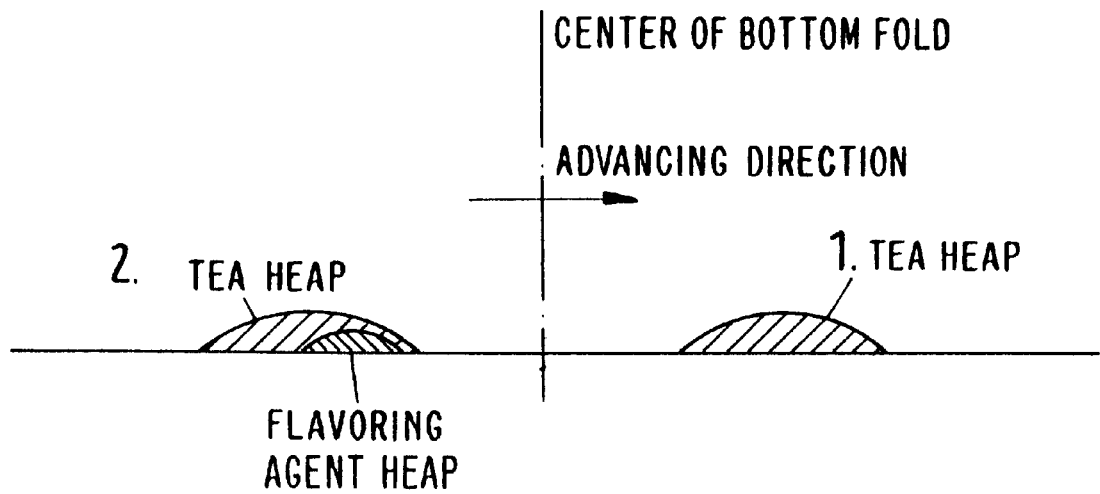
FIG. 3 shows in the same representation as in FIG. 2 a different metering method.

FIGS. 2 and 3 show for illustration purposes the variations of adjustment of the rotating drum 11 whereby according to FIG. 2 both metering chambers 17 and 18 are used for forming small heaps of flavoring agent while according to FIG. 3 only one metering chamber 17 or 18 is used for positioning small amounts of flavoring agent onto the filter paper strip. According to FIG. 2 a twin chamber tea bag is produced in which both chambers contain an amount of flavoring agent. According to FIG. 3, a twin chamber tea bag is produced in which one chamber contains only tea while the other chamber contains tea and flavoring agent. In the embodiment according to FIG. 3 the first chamber 17 is provided with a closure insert while the second chamber 18, as disclosed above, is provided with an insert 16.

The operation of the disclosed device for flavoring tea is as follows.

The filter paper strip 1 moves continuously through the packaging machine. After passing the deflecting roller 3 a small heap 8, 23 of all flavoring agent is positioned with the aid of the metering device 7 onto the filter paper strip 1 by emptying the metering chamber 18 of the rotating drum 11. The metering chamber 18 has been filled, in accordance with the rotational movement of the rotating drum in the upper receiving area by the reservoir 9 with granular or agglomerate flavoring agent. Depending on the selected adjustment, the agent amount is 0.1 to 1 cm$^3$ of granular flavoring agent of the following granule size distribution;

| Distribution in % | Granule size in mm |
|---|---|
| less than 1.0 | smaller than 0.2 |
| less than 3.0 | 0.2 to 0.5 |
| 30–50 | 0.5 to 1.0 |
| 40–60 | 1.0 to 1.4 |
| less than 0.5 | 1.4 to 2.0 |
| maximum 0.2 | greater than 2.0. |

After passing the doctor blade 20, the metering chamber 18 is closed during further rotation by the housing 19 and is only released when the removal position directly above the filter paper strip 1 is reached.

The small heap 8 or 23 of flavoring agent moves with the filter paper strip 1 in the direction toward the tea metering device 4. During this time period, in the same manner as disclosed above, the metering chamber 17 is emptied onto the filter paper strip 1 and a second small heap of flavoring agent is positioned on the filter paper strip 1. While with the metering device 7 more small heaps of flavoring agent formed on the continuously moving filter paper strip 1, the first small heap 23 of flavoring agent will reach a position below the transport wheel 6 of the tea metering device 4 where it is completely covered by the metered amount of tea released by the transport wheel 6. The thus resulting combined heap 26 of flavoring agent and tea in FIG. 1 is shown at the right hand side.

In the same manner the placement of tea onto the already formed small heaps of flavoring agent continuously transported to the tea metering device takes place and subsequently the combined heaps of tea and flavoring agent are packaged respectively in a tea bag in a manner known per se.

At predetermined time intervals the sampling device 21 is activated and sample heaps of flavoring agents are removed by suction via the suction tube 22 and guided into an evaluation device for measuring weight and quality of the flavoring agent. The entire process is monitored by a photo electric sensor 24 which, when detecting anomalies, will turn off the tea packaging machine.

The present invention is, of course, in no way restricted to the specific disclosure of the specification and drawings, but also encompasses any modifications within the scope of the appended claims.

What we claim is:

1. A method for flavoring tea with a granular flavoring agent, said method comprising the steps of:
   a) removing from a reservoir a predetermined amount of the granular flavoring agent;
   b) placing the predetermined amount of the granular flavoring agent as a small heap onto a moving endless envelope material;
   c) subsequently placing a predetermined amount of tea as a heap proximal to the small heap of flavoring agent; and d) enclosing the heaped tea and flavoring agent in a tea bag cut and formed from the moving endless envelope material.

2. A method according to claim 1, wherein the step c) includes the step of completely covering the small heap of flavoring agent with the tea form all exposed sides such that the tea functions as a sealing and protecting layer for the flavoring agent during the step d).

3. A method according to claim 2, wherein the step c) includes the step of positioning the tea off-center relative to the small heap of flavoring agent.

4. A method according to claim 1, further comprising the step of performing a quality and quantity control of the flavoring agent between the step b) and the step c).

5. A method according to claim 4, wherein the step of performing a quality and quantity control of the flavoring agent includes removing a predetermined number of the small heaps of flavoring agent and examining the removed small heaps separately.

6. A method according to claim 1, wherein the step b) includes:
forming the small heap of flavoring agent so as to have a height that is much smaller than a diameter thereof;
selecting a volume of the small heap of flavoring agent to be 0.1 cm$^3$ to 1 cm$^3$;
providing the flavoring agent in the form of granules having a distribution of granule size as follows:

| contents in % | granule size in mm |
|---|---|
| less than 1.0 | smaller than 0.2 |
| less than 3.0 | 0.2 to 0.5 |
| 30–50 | 0.5 to 1.0 |
| 40–60 | 1.0 to 1.4 |
| less than 0.5 | 1.4 to 2.0 |
| maximum 0.2 | greater than 2.0. |

7. A device for flavoring tea with a granular flavoring agent, said device comprising:
means for moving an endless envelope material in an advancing direction;
a tea metering device; and
a metering device for a flavoring agent positioned directly above the endless envelope material upstream of said tea metering device in said advancing direction.

8. A device according to claim 7, wherein said tea metering device and said metering device for the flavoring agent are spaced at a distance and wherein the working cycles of said tea metering device and said metering device for the flavoring agent are coordinated such that a small heap of flavoring agent placed onto the endless envelope material in a metered amount by said metering device for the flavoring agent is completely covered by an amount of tea placed by the tea metering device onto the small heap of flavoring agent.

9. A device according to claim 7, wherein said metering device for the flavoring agent comprises a reservoir and a rotating drum with at least one metering chamber for receiving an amount of flavoring agent from said reservoir and placing the amount of flavoring agent as a small heap onto the endless envelope material.

10. A device according to claim 9, wherein said metering device for the flavoring agent further comprises a housing enclosing said rotating drum and having an inlet for allowing passage from said reservoir into said at least one metering chamber and an outlet for releasing the flavoring agent from said at least one metering chamber.

11. A device according to claim 9, wherein said metering device for the flavoring agent further comprises a means for air-conditioning.

12. A device according to claim 9, further comprising a doctor blade positioned at said rotating drum for removing excess flavoring agent from said at least one metering chamber.

13. A device according to claim 9, wherein said rotating drum comprises two radially extending cutouts and two inserts placed into said cutouts and having radially outwardly positioned depressions defining said metering chambers.

14. A device according to claim 13, wherein said inserts are adjustable.

15. A device according to claim 13, wherein said inserts are removable and exchangeable.

16. A device according to claim 13, wherein said depressions are concave and have a drop shape with a deep portion and a shallow portion.

17. A device according to claim 16, wherein in a direction of rotation of said rotating drum said shallow portion is leading and said deep portion is following.

18. A device according to claim 7, further comprising a device for performing a quality and quantity control of the flavoring agent positioned in said advancing direction downstream of said metering device for the flavoring agent.

19. A device according to claim 18, wherein said device for performing a quality and quantity control is comprised of a suction device including a suction tube, positioned above the endless envelope material, and a vacuum pump.

20. A device according to claim 18, further comprising at least one sensing device for monitoring the small heaps of flavoring agent, said sensing device positioned between said metering device for the flavoring agent and said tea metering device.

21. A device according to claim 20, wherein said sensing device is a photoelectric sensor.

22. A device according to claim 21, wherein said sensing device is positioned in said advancing direction upstream of said device for performing a quality and quantity control of the flavoring agent.

23. A device according to claim 21, wherein said sensing device is positioned in said advancing direction downstream of said device for performing a quality and quantity control of the flavoring agent.

24. A device according to claim 21, wherein one of said sensing devices is positioned in said advancing direction upstream of said device for performing a quality and quantity control of the flavoring agent and another one of said sensing device is positioned downstream of said device for performing a quality and quantity control of the flavoring agent.

* * * * *